(12) United States Patent
Moritzen (10) Patent No.: US 8,024,798 B2
(45) Date of Patent: Sep. 20, 2011

(54) METHOD AND APPARATUS FOR PROTECTING AGAINST BUFFER OVERRUN ATTACKS

(75) Inventor: Klaus Moritzen, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 1040 days.

(21) Appl. No.: 11/418,182

(22) Filed: May 5, 2006

(65) Prior Publication Data

US 2006/0259435 A1    Nov. 16, 2006

(30) Foreign Application Priority Data

May 6, 2005  (DE) .......................... 10 2005 021 064

(51) Int. Cl.
*G06F 12/14* (2006.01)
*G06F 9/00* (2006.01)
*G06F 9/44* (2006.01)

(52) U.S. Cl. ............. 726/22; 726/25; 717/127; 713/100

(58) Field of Classification Search ............... 726/22–25; 717/127–129; 713/100; 709/223–226
See application file for complete search history.

(56) References Cited

U.S. PATENT DOCUMENTS

| | | | | |
|---|---|---|---|---|
| 4,096,568 A * | 6/1978 | Bennett et al. | ................ | 711/206 |
| 4,328,542 A * | 5/1982 | Anastas et al. | ................ | 711/163 |
| 6,327,618 B1 * | 12/2001 | Ahlstrom et al. | ............. | 709/223 |
| 6,513,110 B1 * | 1/2003 | Keppel et al. | ................. | 712/227 |
| 6,757,871 B1 * | 6/2004 | Sato et al. | ...................... | 715/236 |
| 2002/0095524 A1 * | 7/2002 | Sanghvi et al. | ............... | 709/318 |
| 2002/0138706 A1 * | 9/2002 | Hugly | ............................ | 711/163 |
| 2003/0023593 A1 * | 1/2003 | Schmidt | ............................ | 707/6 |
| 2004/0034794 A1 * | 2/2004 | Mayer et al. | .................. | 713/200 |
| 2004/0039594 A1 * | 2/2004 | Narasimhan et al. | ............. | 705/1 |
| 2004/0243833 A1 * | 12/2004 | Spacey | ......................... | 713/200 |
| 2006/0047958 A1 * | 3/2006 | Morais | .......................... | 713/166 |

FOREIGN PATENT DOCUMENTS

| | | |
|---|---|---|
| EP | 1 321 844 A2 | 6/2003 |
| GB | 2 402 236 A | 12/2004 |

* cited by examiner

*Primary Examiner* — Kambiz Zand
*Assistant Examiner* — Michael Guirguis
(74) *Attorney, Agent, or Firm* — Harness, Dickey & Pierce, PLC (57) ABSTRACT

A method and an apparatus are disclosed for monitoring and protecting a program system against buffer overrun attacks. The method includes identification of whether there is an unsafe combination of rights for a loaded memory segment; a check to determine whether an unsafe combination of rights is permissible as an exception, and a defense measure, through deletion of the right if there is an unsafe combination of rights and this combination of rights is not permissible. The method also may include a repair measure which repairs the damage which has been caused by the deletion of the right.

25 Claims, 2 Drawing Sheets

METHOD AND APPARATUS FOR PROTECTING AGAINST BUFFER OVERRUN ATTACKS

The present application hereby claims priority under 35 U.S.C. §119 on German patent application number DE 10 2005 021 064.3 filed May 6, 2005, the entire contents of which is hereby incorporated herein by reference.

FIELD

The invention generally relates to the field of program-based inventions. For example, it may relate particularly to a method and/or an apparatus for protecting a software-based system against attacks which exploit security gaps in the system, such as viruses, worms or the like.

BACKGROUND

One of the most frequent security gaps is what is known as buffer overrun or buffer overflow. This basically involves damage which is caused by a buffer or a memory area of a program being filled beyond its boundaries. Data are written beyond the end of the buffer. Thus, the data which are relevant to program execution are overwritten. Some of the aforementioned attacks are based on the principle of writing an executable code to the stack, which is then executed and can cause errors which are in some cases serious.

Errors of this type arise predominantly in traditionally compiled programming languages, such as C+ and C++, since these languages do not offer automatic checking of access operations to fields and memory segments for performance reasons. Programming errors can also cause the aforementioned security problems by making inadequate requests for the boundaries of the fields which are written to the stack dynamically. A hacker can exploit this by feeding a hacking code into the local buffer which will be executed at a later time.

In the operating systems which are popular today (Windows 95 and above), each processor has its own logical address space. An area in this address space is taken up by a stack. When a program is started, the operating system usually creates three segments in the virtual memory: the code segment, the data segment (heap segment) and the stack segment. The stack is a buffer store for local variables, transfer parameters for functions and also for return addresses for subprograms. The stack starts at a defined address, principally at the end of the address space, and grows downward and on the basis of the last-in-first-out principle (LIFO buffer). Its size is mainly dependent on the recursion depth of the respective program. Possible instructions for editing the stack are the push and pop instructions for writing data to the stack and reading the data from the stack. In addition, it is possible to address individual stack elements directly.

During a hack, information is deliberately written to the stack beyond its end, so that the return address of a function is overwritten with a fed address. When the function has been executed, the program is therefore no longer able to return to the calling function, but rather jumps to the fed address. If the fed address is a randomly selected address, the program in question is usually merely terminated without causing further damage. If the fed address is a valid address in the program, the program is executed in manipulated fashion and hence incorrectly. Most attacks feed an address which refers to stack addresses onto which the hacking code has previously been loaded and hence can cause massive and extensive damage.

To be able to ensure protection against such attacks, it is known practice in systems from the prior art to use what are known as virus scanners, security updates and firewalls. A virus scanner uses the patterns known to it (code patterns for known viruses) to detect an attack. A drawback of this known solution is that the virus scanner works only when it has a pattern for the respective worm or virus so as to be able to trigger an alarm. That is to say that the patterns need to be constantly updated and their quality is dependent on the update level.

Security updates are normally modified operating system components which are provided by the manufacturer and repair security gaps which have already been detected. A fundamental problem of security updates can be seen in that the system basically has no protection in the time between release by the manufacturer and identification of the security gaps. In addition, another problem is that it is not possible to provide protection for security gaps which are not yet general knowledge, that is to say those which, although already known to a limited group of users, have not yet been listed.

Firewalls are active network communication components. They work in the manner of a barrier which passes on only particular network traffic. One difficulty of programming firewalls is not setting the firewall's barrier too high, so that the computer communication is restricted too much, and similarly not setting the barrier too low, which would result in an increased security gap.

In addition, it is known practice in Windows-based operating systems to resort to the processor technology. In this context, the processor technology from the company AMD provides what is known as the No-execute-Page-Protection processor feature (NX). The processor technology from the company Intel has a similar feature, known as the Execute-Disable-Bit-Feature. The 64-bit architectures in Windows support the aforementioned hardware, which provides an instruction rejection function (Data Execution Prevention, DEP). Stack and heap are marked as data by the Windows operating system. If an application now attempts to call a memory page marked as NX, the processor triggers an "exception", which results in the triggering process being terminated or interrupted.

A fundamental drawback of this solution can be seen in that earlier applications are no longer able to work following installation of the Microsoft Service Pack. Earlier programs therefore may need to be completely revived, which entails a high cost risk. Furthermore, it is disadvantageously necessary to use a particular processor technology. Other computer architectures, particularly the 32-bit architecture, are therefore excluded from protection. A further drawback of this approach can be seen in that there is no protection for attacks which relate to memory segments other than the stack or the heap.

SUMMARY

An object of at least one embodiment of the invention is to demonstrate a way which allows both existing and future systems to be protected generically against attacks which are based on buffer overrun without needing to change existing operating system components and without the protective mechanisms needing to be continually updated on an ongoing basis.

At least one embodiment of the invention achieves an object via a method for monitoring and protecting a program system against attacks which are based on the intention to write data to a memory segment of the program and to execute these data as a code, that is to say are particularly based on buffer overrun, with the following method steps: in this case, a memory analysis component can be intended to execute at least the following steps A and B:

A—identification of whether there is an unsafe combination of rights for a memory segment, particularly whether there are simultaneously a Write right and an Execute right, B—if an unsafe combination of rights has been detected: deletion of the Write right or of the Execute right and having the following method steps, which are carried out at runtime, particularly by a runtime component, if the program has been interrupted:

C—examination of the reason for which the program has been interrupted

D—if appropriate:

initiation of recovery measures if an attack has been identified, exchange of rights if the interruption has been produced by the deletion of a right, or forwarding of the monitoring and/or control to an operating system component if another reason for interruption has been identified or if the exchange of rights is not able to prompt removal of the interruption.

One fundamental aspect of the solution of at least one embodiment, can be seen in that it comprises two fundamental components: one which checks the memory segments cyclically and is independent of the execution of the program which is to be monitored (the memory analysis component), and a second component which is active at the program's runtime and executes further analysis of the cause of the interruption to the program by a "memory management unit" (MMU for short) and possibly initiates further measures (the runtime component) The two components are independent of one another.

In one advantageous embodiment of the invention, during the monitoring operation all relevant monitoring parameters, particularly the technical parameters required for making the case distinctions, are detected, stored and/or possibly forwarded to further units. These are the following parameters, inter alia: attributes of the examined memory segment, source of the program component accessing the memory segment, and the information regarding whether or not it is a trustworthy source.

An object of at least one embodiment may also be achieved by an apparatus and/or a product.

In this connection, it should be pointed out that individual components of the method can be implemented in a saleable unit and the rest of the components can be implemented in another saleable unit.

At least one embodiment of the invention lays fundamental emphasis on closing continually arising security gaps in software-based systems and protecting these systems against hacks or attacks which are based on consciously producing a buffer overflow.

In modern operating systems, each program operates in its own, virtual address space. This virtual address space is managed and organized by the memory management unit (MMU) and is assigned to physical memory addresses only when required. The MMU also manages the access rights for memory segments, that is to say a Write right, a Read right and/or an Execute right, for example.

The basic idea of at least one embodiment of the invention is based on the circumstance that both the system operator (that is to say the operating system components) and the application developer normally allocate the access rights with little restriction. That is to say that normally there are both an Execute right and a Write right for a section in the memory, particularly in the stack. Precisely this combination of rights makes it very easy for hackers to feed hacking or destructive codes by means of deliberate buffer overflow (using the Write right: to write to the buffer segment) and then to execute the destructive code (using the Execute right).

At least one embodiment of the invention implements this idea by automatically checking all memory segments cyclically to determine whether there is a respective unsafe combination of rights for the memory segment which is to be monitored, and if so: one of the two rights is deleted.

There are also exception conditions, however, under which an unsafe combination of rights is permissible as an exception, so that there may be both a Write right and an Execute right as an exception.

Since there are stipulated exception conditions which require that there be an Execute right and a Write right at the same time, that is to say that the aforementioned unsafe combination of rights exists, it can be assumed that in most cases this unsafe combination of rights is not necessary.

At least one embodiment of the invention makes use of this idea and automatically checks whether such an exception condition exists, that is to say whether there must also be the Execute right at the same time as the Write right as an exception. If this is not the case, one of the rights is deleted. This allows any unsafe combination of rights to be avoided in generic fashion. This has the extremely far-reaching effect that it is possible to defend against all attacks which are based on feeding data as a code and executing this code.

An important advantage of the inventive solution of at least one embodiment can be seen in that it does not require new updates for the protective mechanism to be continually loaded, as is necessary with the previously known virus scanners from the prior art, for example.

In addition, in at least one embodiment, it is advantageously possible to support all computer architectures whose MMUs have a separate Execute bit, that is to say including the previously existing hardware, particularly the 32-bit architecture.

In line with an example embodiment of the invention, a separate additional component from the previous operating system components is provided which is incorporated into the system as a separate element merely on a functional basis. In one alternative embodiment, the component may also be embedded into the operating system.

In this component, at least one embodiment of the inventive method is implemented, which cyclically monitors all loaded memory areas or memory segments to determine whether they have sufficient protection against attacks. The monitoring is performed by checking whether there is an unsafe combination of rights for a segment, that is to say whether there are simultaneously a Write right (for feeding hacking codes) and an Execute right (for the hacking code to take control and hence for executing the destructive code). If it is now established that there is not sufficient protection, a subsequent check is also performed to determine whether this unsafe combination of rights is permissible or necessary as an exception. This is the case, for example, when a known component requests these access rights, and hence the unsafe combination of rights cannot be avoided.

Otherwise, one of the two rights is deleted. The method steps up to this time can also be carried out in advance and do not need to be carried out at the program's runtime.

Normally, it is possible for correct operation to be guaranteed even when one of the two rights (Execute right or Write right) is deleted. In these cases, no further measures are therefore required.

In principle, provision is made for one of the two rights to be deleted as soon as an unsafe combination of rights has been detected or when it has additionally been detected that this combination of rights was not permissible even as an exception. The reason why the program was interrupted, i.e. why the MMU generated an "interrupt", is not examined until at a later time during the program's runtime.

A special routine or component, namely the runtime component, therefore examines whether the damage has been caused only because one of the two rights has been deleted. In this case, an exchange of rights can take place.

If appropriate, further measures are initiated. By way of example, the further measures may be a report to a system administrator and/or to the user or central network monitoring.

If there is otherwise an exceptional case present, namely so that damage is caused when one of the two aforementioned rights is deleted, at least one embodiment of the invention advantageously provides for this damage to be handled using suitable measures.

Within the context of at least one embodiment of the invention, the term damage is also intended to refer to the damage which has possibly been caused by the execution of the inventive method, that is to say by the deletion of one of the two rights. Unless stated otherwise, this is not the damage which could be caused by the attack. In line with at least one embodiment of the invention, this damage can be tracked further using the usual mechanisms from the prior art. The term damage can be defined within the context of at least one embodiment of the invention as disrupted program execution as a result of at least one right (READ, WRITE, EXECUTE) being absent.

A suitable measure for repairing the damage which has possibly been caused is an exchange of rights. An exchange of rights involves the right deleted by the method being reallocated (to the memory segment), but the respective other right being withdrawn from it. Thus, if the Write right was previously withdrawn, then instead of this right the Execute right is now withdrawn. The analysis process is then executed again.

In a simpler embodiment of the invention, the inventive method includes no exchange of rights and covers only the two case groups that recovery measures are initiated or that the monitoring is forwarded to another operating system component.

Advantageously, at least one embodiment of the invention provides for particular exception conditions to be able to be stipulated which define the circumstances under which an unsafe combination of rights is necessary and hence permissible for operation as an exception. In an example embodiment of the invention, this covers scenarios in which a loader loads a piece of software from a trustworthy source.

In this case, the respective memory segment requires Write rights. So that now the loaded piece of software can actually be started, this segment requires Execute rights. For the time of execution, however, the Write rights are normally no longer required. Exception conditions exist, particularly also in the case of a loader for a just-in-time compiler for "managed code".

In addition, specific device drivers can be specified which require the cumulative existence of the two rights in order to operate correctly. Depending on the system, it is naturally also possible for further exception conditions to be defined which affirm the permissibility of the unsafe combination of rights as an exceptional case. These are then handled in a specific way in line with at least one embodiment of the invention.

In all other cases, one of the two rights can be deleted without any further problems, the result of which is that it is possible to defend against all attacks based on buffer overflow.

If it is established that there is an unsafe combination of rights, at least one embodiment of the invention deletes one of the two rights. The decision regarding which of the two rights is deleted can be made according to presettable criteria, which can be set by the system administrator and/or user. The deletion conditions are adaptively configurable in line with the invention, which means that an administrator can also include further criteria at a later time (that is to say even after the inventive solution has been started) and hence can extend the previous ones or can make other changes.

In an example embodiment, this case distinction is made dependent on the type of the respective memory segment, inter alia. Thus, memory segment attributes contain data about the nature or type of the respective segment, for example.

The inventive solution of at least one embodiment also contributes to the transparency of the monitoring operation by virtue of it being possible either to trace or carry monitoring cycles. This makes it easier for the system administrator to produce a system analysis over time in respect of the attacks.

At least one embodiment of the invention provides for all parameters which are relevant to the monitoring to be combined in a "monitoring context". In particular, the monitoring parameters include the data which are required for responding to or making the respective case distinctions. That is to say, by way of example, information about which program is accessing the memory segment: is it a known program, e.g. a loader from a trustworthy source, or an unknown unit? This requires that all system components be made known to the inventive component in at least one embodiment.

In one alternative example embodiment of the invention, provision is made for the monitoring context to be extended to the extent that it still detects further parameters, particularly the time profile of the monitoring operation or other parameters, for example. This has the advantage that the inventive solution of at least one embodiment can be expanded dynamically without any further complexity.

In an example embodiment of the invention, provision is made for all loaded memory segments or a predeterminable selection of memory segments to be checked cyclically after presettable time intervals in accordance with at least one embodiment of the inventive method having at least one of the features described above. The advantage of this embodiment can be seen in that the user merely needs to set a usual time interval and does not need to stipulate any further monitoring conditions.

As an alternative to the aforementioned embodiment, the monitoring can also be triggered by other events. The selection of the events which are intended to trigger the monitoring operation can likewise be set. This means that at least one embodiment of the inventive solution can be adjusted flexibly to other application situations.

Another fundamental advantage of at least one embodiment of the inventive solution can be seen in that it is independent of the compiler used and/or is independent of the processor technology or of the respective computer architecture. It is merely necessary for the case distinction to be able to be made regarding whether there is an unsafe combination of rights. At least one embodiment of the invention does this by retrieving the respective Execute bit from the MMU.

One important advantage of at least one embodiment of the inventive solution can be seen in the automatic execution of the method. In an example embodiment of the invention, all method steps (A to D) are therefore executed automatically. In alternatives, however, it is also conceivable for the user to control the execution of the method by way of appropriate user inputs, so that the method is carried out only semi-automatically.

Normally, the method is in a form such that the result and/or result elements of the monitoring method and particularly the monitoring parameters are stored and/or displayed.

Steps C and D are executed at runtime by the runtime component. In this case, the examination in step C is made at least on the basis of the following criteria:

examination of whether there is neither a Write instruction without a Write right nor an Execute instruction without an Execute right, and if so:

forwarding of the monitoring or interruption to another unit, examination of the respective memory segment, particularly evaluation of memory segment attributes regarding whether the memory segment has Write rights but can be identified as a code segment or whether it has Execute rights but cannot be identified as a code segment:

identification of damage which has been caused by the deletion of a right in step B of this method; further measures which can be initiated are an exchange of rights and/or continuation of the interrupted program in other cases: identification of an attack.

It is also possible to make the execution of the limiting operation or of the rights deletion operation dependent on what damage is caused by the deletion of the right. By way of example, it is thus possible to set that the right is deleted in any case if the damage caused by the deletion is repairable. In other cases, there may be a preset that appropriate advice is reported and the program remains interrupted.

The statements made above, advantages and advantageous, alternative embodiments apply in corresponding fashion to at least one embodiment of the inventive apparatus too.

The inventive embodiments of the method which have been described above may also be in the form of a computer program product, with a computer-readable medium and with a computer program and associated program code segments, the computer being prompted to carry out the inventive method described above when the computer program has been loaded.

An alternative way of achieving the object provides a storage medium which is intended to store the computer-implemented method described above and which is computer-readable.

BRIEF DESCRIPTION OF THE DRAWINGS

The detailed description of the figures below discusses example embodiments (which are not to be understood as restrictive) with their features and further advantages with reference to the drawings, in which.

DETAILED DESCRIPTION OF THE EXAMPLE EMBODIMENTS

The detailed description of the figures below describes the application of embodiments of the inventive solution to attacks which are caused by buffer overrun, by way of example. However, it is likewise possible for embodiments of the invention to be applied to other attacks, which are based on feeding destructive code into memory segments and then executing it.

In addition, the description below is discussed in an example manner, based on the Windows operating system. However, the principles of embodiments of the invention can likewise be transferred to other operating systems. In particular, Linux should be mentioned here, since this operating system also has a number of known security gaps ("vulnerabilities") based on buffer overrun.

At least one embodiment of the invention relates to a monitoring method for protecting a software-based system which includes at least one program and which is aimed at defending against attacks which are based on buffer overrun in a memory segment.

The method includes identification of whether there is an unsafe combination of rights for a memory segment, that is to say particularly whether there are simultaneously both a Write right and an Execute right.

In addition, at least one embodiment of the invention checks whether an unsafe combination of rights is permissible as an exception. Normally, this check is executed only if the previously performed identification has revealed that there is an unsafe combination of rights of this type.

In step B, the access rights for the respectively checked memory segment are limited by deleting one of the two rights (either the Write right or the Execute right) if it has been established that there is inadequate protection against buffer overrun and if it has been established that the unsafe combination of rights is not permissible as an exception. It would be permissible as an exception particularly when a known component requires this combination of rights.

In a later method step, it is possible to examine, particularly at runtime, whether there is any damage which has been initiated by the deletion of a right (Write right or Execute right) and whether this damage can be repaired. This is possible by way of an exchange of rights, for example. This refers to exchange of the right which is to be deleted. Hence, if the first component deleted the Write right, the Write right can be reallocated at this position, while the respective other right—in this case the Execute right—is deleted, or vice versa.

In an example embodiment, method step D comprises this exchange of rights.

Figure 1:
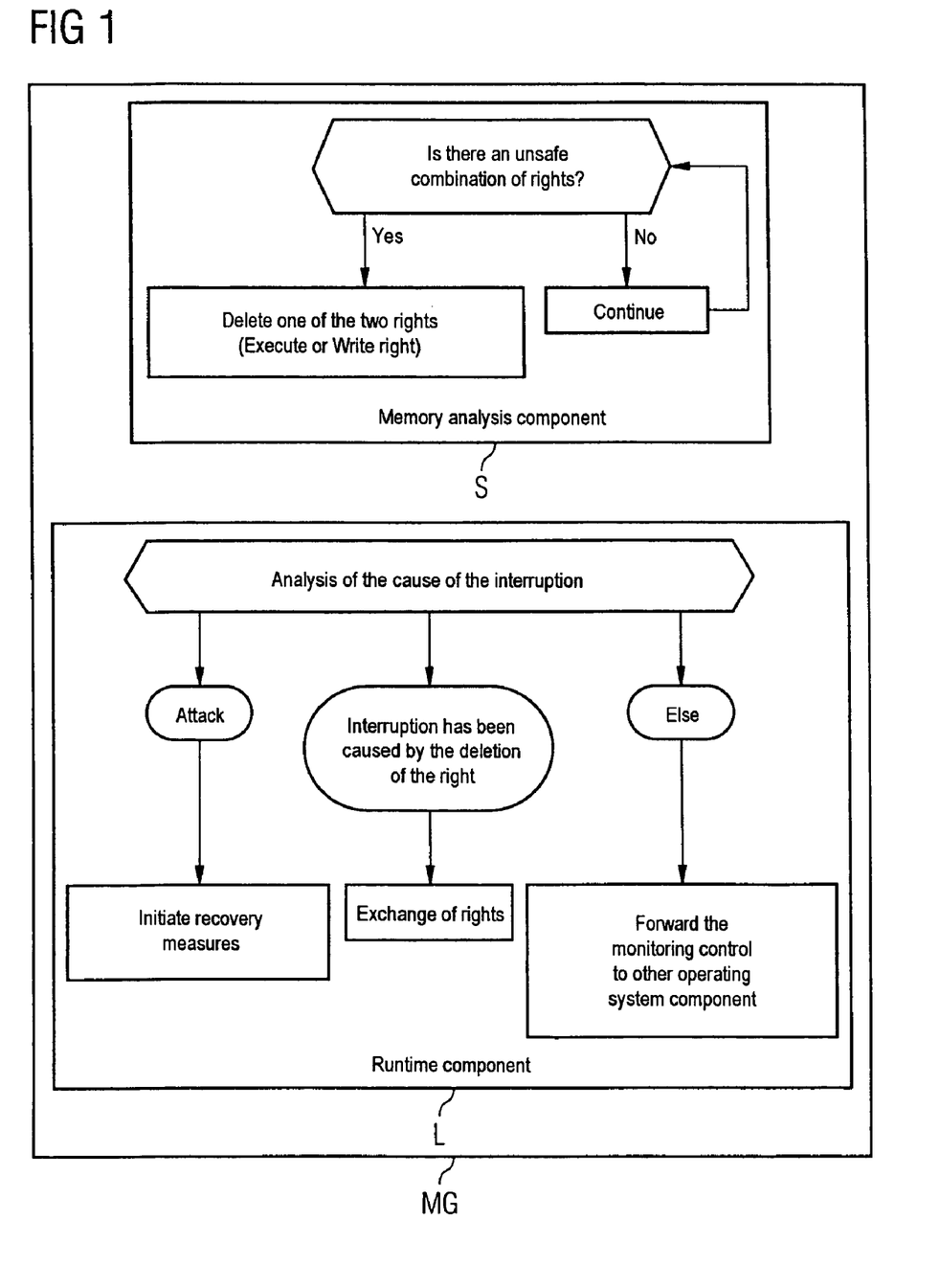
FIG. 1 shows an overview-type illustration of an inventive cycle in line with an example embodiment of the invention.

FIG. 1 shows a sequence for at least one embodiment of the inventive solution in the manner of an overview.

A memory segment analysis component S examines whether there is an unsafe combination of rights, namely whether WRITE and EXECUTE (or WRITE and EXECUTE rights) have been set at the same time for a memory segment which is to be checked. If so, one of the two rights is deleted. This check on the memory segments takes place cyclically or is triggered by the occurrence of configurable events.

A runtime component L executes steps C and D. This involves examining the reason for which the MMU generated an interrupt, that is to say the reason for which the program has been interrupted.

This examination can take a plurality of aspects into account. In an example embodiment, a first step is used to analyze whether there is a Write right, if a Write instruction is to be executed, and whether there is an Execute right, if a routine or function is to be executed. If this condition is met, the examination is continued. Otherwise, the monitoring is forwarded to another component in the operating system, together with monitoring-specific parameters.

A second step is used to examine whether the allocation of the right actually matches the type of memory segment. This therefore detects and identifies the damage which has possibly been caused by the inventive deletion of one of the two rights. A check is performed to determine whether a memory segment has Write rights that can be identified as a code segment, and a check is performed whether a memory segment has execution rights that cannot be identified as a code segment. If the allocated right does not match the type of memory segment, the damage has been caused by the deletion of the right. At this point, it is possible to initiate an exchange of rights (assign WRITE and delete EXECUTE, or vice versa) and then to continue the method.

In all other cases, an attack is identified. It is then possible to use the usual recovery measures (e.g. report to the user etc.).

In cases in which control is passed on, an appropriate monitoring context is likewise forwarded, said monitoring context comprising the call stack, the interrupt level etc. in particular.

The method presented here allows defence against attacks which feed data into the stack and later execute them. In principle, the data stored in the stack are not protected against unintentional changes, however. If a hacker succeeds in deliberately writing code to the stack, for example, he can manipulate the return address, so that execution jumps to a code which has been fed beforehand. Attacks which are based on this principle can be defended against successfully and generically by at least one embodiment of the inventive solution.

It is also possible to defend against hacks which relate not only to the stack or to the heap but also to other memory segments.

Further advantages of at least one embodiment of the inventive solution, particularly in contrast to the aforementioned prior art, can be seen in that the solution is minimally invasive, since other sequences on the computer system are adversely affected only to a minimum extent—if at all. In addition, the solution is very effective, since it covers a broad class of attacks, and is also low-maintenance, since there is no need to update virus patterns, port tables etc. for new security gaps or newly detected hacks.

Advantageously, at least one embodiment of the inventive solution takes account of several aspects for assessing the question of whether the loaded memory segments provide adequate protection against buffer overrun. This is basically a cascaded decision. In a first step, a memory analysis component S examines whether the respective segment has a Write right and an Execute right at the same time. If this can be answered in the affirmative, there is basically an unsafe combination of rights.

A second step can be and is used to check whether this unsafe combination of rights is required for operation as an exception. Only if it is established, particularly by requesting further system parameters, that the unsafe combination of rights is not required, even as an exception, does the invention assume that the checked memory segment has adequate protection against buffer overrun, or no further measures are initiated in this case.

If there is not adequate protection against buffer overrun, at least one embodiment of the invention initiates protective measures or defence measures against possible attacks. These involve limiting the access rights, particularly deleting one of the two rights (Execute right or Write right).

In addition, at least one embodiment of the inventive method includes repair measures. These repair measures are used if damage is identified which has been caused by one of the rights having been deleted. If possible, this damage is repaired. This can be done by means of an exchange of rights, in particular. However, at least one embodiment of the invention has provision for other repair measures cumulatively or alternatively.

Overall, it can be stated that at least one embodiment of the invention controls three fundamental events:
1. Checking for adequate protection against attacks: this area covers identification of whether there is an unsafe combination of rights (Write and Execute rights) for a memory segment and checking whether this unsafe combination of rights is permissible as an exception.
2. Measures for protecting a memory segment which has been detected as unsafe: this area covers limiting the access rights by deleting one of the two rights.
3. Repair measures: this area relates to the repair of damage which has been caused by at least one embodiment of the inventive method having been applied, namely by one of the two rights having been deleted.

Overall, at least one embodiment of the present invention basically has three areas of activity: checking for adequate security, providing adequate security and repairing any damage, if necessary.

In one alternative embodiment, which covers only a subdivision of the areas mentioned above, provision is merely made for the check on and provision of adequate protection to be provided. The repair of damage is consciously omitted. The respective method accordingly includes only steps A, B and C and not method step D.

The advantages and variant embodiments which have been cited in connection with the method likewise apply to the apparatus and the product.

The advantage of this solution is that it is more compact and is equipped with an interface, so that existing recovery products and systems can be connected on a functional basis. The lower complexity of this embodiment likewise makes it more transparent.

Figure 2:
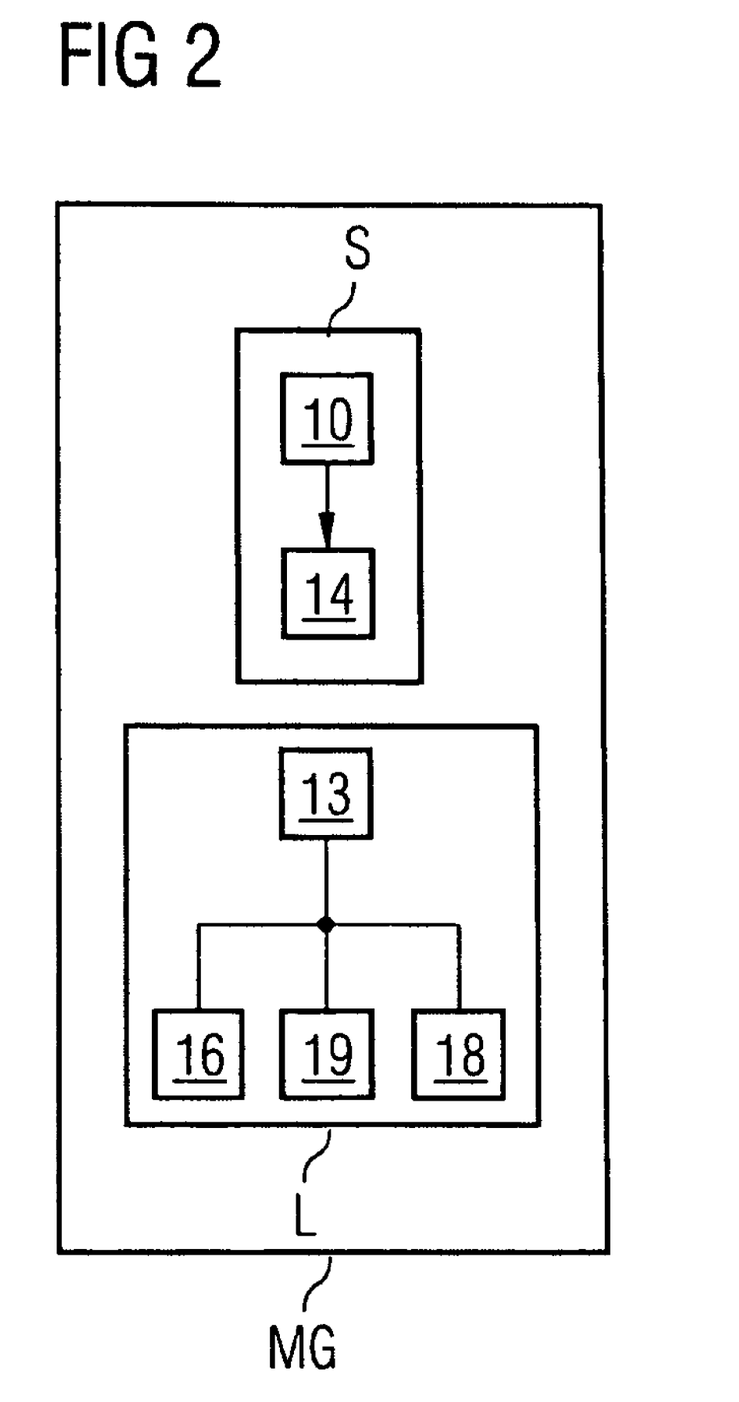
FIG. 2 shows an overview-type illustration of components and units in the inventive apparatus in line with an advantageous embodiment.

FIG. 2 shows an overview of the fundamental units in an inventive apparatus in the form of the memory guard MG. The monitoring apparatus or memory guard MG in the preferred embodiment includes two components:
the memory analysis component S and
the runtime component L.

The memory analysis component S comprises an identification unit 10 and a limiting unit 14.

The identification unit 10 is intended to identify whether there is an unsafe combination of rights for a memory segment, particularly whether there are a Write right and an Execute right at the same time.

The limiting unit 14 is intended to delete the Write right or the Execute right if there is an unsafe combination of rights and if the unsafe combination of rights is also not permissible as an exception when an exception condition is checked.

The runtime component L includes an interruption analysis unit 13 which is intended to examine the reason for interruption. For its part, this unit includes:
a recovery unit 16 which is intended to initiate all or selected recovery measures if the interruption and analysis unit 13 has identified an attack
a forwarding unit 18 which is intended to forward the monitoring and/or control to at least one other operating system component if another reason for interruption has been identified, and
possibly comprising an exchange unit 19 which is intended to reallocate the right deleted by the limiting unit 14 and to delete the respective other right.

In an example embodiment, the inventive apparatus is in the form of a separate module. However, alternative forms provide for the memory Guard MG to be integrated into other units as a module, particularly into the operating system or into the MMU (Memory Management Unit).

The memory guard MG has interfaces to the MMU. The reason for this is that if the MMU outputs an exception, it is necessary to examine whether this has been initiated by the deletion of one of the rights. If so, an exchange of rights can be triggered. If the exception has been output for another reason, it is necessary for the exception to reach the software. In this case, the memory guard MG needs to forward the exception. That is to say that it sets the stack in the way in which it was set when the memory guard MG received the exception. It then forwards control (Interrupt, Interrupt Return or Call or Return) in the same way as the way in which it received it.

Overall, at least one embodiment of the inventive memory guard MG is much more effective against attacks, since it decides more restrictively which memory segments need to have instructions executed than Microsoft's Windows XP SP2 DEP from the prior art, for example.

In addition, the memory guard MG uses other criteria in the decision regarding which memory segments need to be protected. This allows a high level of protection against attacks to be attained.

It is also possible for the memory guard MG to be implemented on 64-bit AMD and Intel processors.

An important advantage of at least one embodiment of the inventive solution can also be seen in that implementing at least one embodiment of the invention requires no basic changes to the previous prior art. Thus, it can also be integrated retrospectively as a chip without any difficulty.

Finally, it should be pointed out that the description of example embodiments of the invention are in principle not to be understood to be restrictive in respect of a specific physical implementation of the invention. For a person skilled in the relevant art, it is obvious, in particular, that the invention can be implemented partly or completely using software and/or hardware and/or in a form in which it is distributed over a plurality of physical products—in this case particularly including computer program products.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for monitoring and protecting a program system against attacks which are based on the intention to write data to a memory segment of a program and to execute these data as a code, the method comprising:
   identifying whether there is an unsafe combination of Write and Execute rights for the memory segment;
   deleting one of the Write and Execute rights, if the unsafe combination has been identified; and
   carrying out the following steps at runtime if the program has been interrupted,
   examining a reason for which the program has been interrupted, initiating recovery measures if an attack has been identified,
   exchanging rights if the interruption has been produced by the deletion of a right, and
   forwarding at least one of monitoring and control to an operating system component if another reason for interruption has been identified, wherein
   the unsafe combination of the Write and Execute rights includes a simultaneously existence of the Write and Execute rights, and
   the identifying includes monitoring the memory segment for a presence of the unsafe combination of Write and Execute rights, the monitoring being performed either cyclically or being triggered by an occurrence of configurable events.

2. The method as claimed in claim 1, wherein the exchange of rights is executed by reallocating the at least one deleted right and deleting the respective other right.

3. The method as claimed in claim 1, wherein the deletion of the at least one right includes a case distinction regarding which of at least one of the Write right and Execute right, which is based on at least one of evaluable attributes of the memory segment and is executed on the basis of further, presettable criteria.

4. The method as claimed in claim 1, further comprising:
   reporting at least a selection of executed method steps, reporting damage to the memory segment, and reporting at least one of intended and implemented damage repair measures.

5. The method as claimed in claim 1, wherein the examining is made at least on the basis of the following criteria:
   examining whether there is neither a Write instruction without a Write right nor an Execute instruction without an Execute right, and if so, forwarding the monitoring, examining the respective memory segment, identifying damage caused by the deletion of at least one right, and identifying an attack.

6. The method as claimed in claim 1, wherein at least one of all, all loaded and a selection of the memory segments are checked cyclically after presettable time intervals by executing the method steps of identifying and deleting.

7. The method as claimed in claim 1, wherein the method is compiler-independent.

8. The method as claimed in claim 1, wherein the method supports all computer architectures whose memory management units have an Execute bit.

9. The method as claimed in claim 1, wherein at least one of method steps is performed automatically.

10. The method as claimed in claim 1, wherein the result of at least one of the monitoring and protection method are at least one of detected, stored and displayed.

11. An apparatus for monitoring and protecting a program system against attacks which are based on an intention to write data to a memory segment of a program and to execute these data as a code, the apparatus comprising:
at least one memory analysis component stored in a memory, including:
at least one identification unit to identify whether there is an unsafe combination of Write and Execute rights for a memory segment;
at least one limiting unit to delete one of the Write and Execute rights ff the unsafe combination is identified; and
a runtime component executed on a processor, including: at least one interruption analysis unit to examine a reason for an interruption;
at least one recovery unit to initiate selected recovery measures if the interruption analysis unit has identified an attack; and
at least one forwarding unit to forward the monitoring and control to another component, if another reason for interruption has been identified, wherein
the unsafe combination of the Write and Execute rights includes a simultaneously existence of the Write and Execute rights, and
the at least one identification unit monitors the memory segment for a presence of the unsafe combination of Write and Execute rights, the monitoring being performed either cyclically or being triggered by an occurrence of configurable events.

12. The apparatus as claimed in claim 11, wherein the interruption analysis unit analyzes the reason for interruption by at least one of:
examining whether there is neither a Write instruction without a Write right nor an Execute instruction without an Execute right, and if so, identifying an incorrect response, evaluating memory segment attributes regarding whether a memory segment has Write rights and can still be identified as a code segment or whether it has Execute rights and still cannot be identified as a code segment, and identifying damage which has been caused by the deletion of a right by the limiting unit, and identifying an attack in all other cases.

13. The apparatus as claimed in claim 11, wherein the limiting unit limits the access rights to the respective memory segment by deleting at least one of the Write right and the Execute right on the basis of at least one of evaluable attributes of the memory segment and further presettable criteria.

14. The apparatus as claimed in claim 11, wherein the apparatus further comprises:
at least one reporting unit to report results from at least one of at least one of the components and at least one of the units, report damage to the memory segment, and report at least one of intended and implemented damage repair measures.

15. The apparatus as claimed in claim 11, wherein the apparatus further comprises:
a module to at least one of report to at least one of the user and a central entity and to initiate further monitoring measures if an attack has been detected.

16. The apparatus as claimed in claim 11, wherein at least one of all, all loaded and a selection of the memory segments are checked cyclically after presettable time intervals.

17. The apparatus as claimed in claim 11, wherein the apparatus is independent of a compiler for the program.

18. The apparatus as claimed in claim 11, wherein the apparatus supports all computer architectures whose memory management unit has an Execute bit.

19. The apparatus as claimed in claim 11, wherein at least one of at least one of the components and at least one of the units operate automatically.

20. The apparatus as claimed in claim 11, wherein at least one of the result from the monitoring and protective apparatus are at least one of detected, stored and displayed.

21. The method of claim 1, wherein the step of identifying includes identifying whether there are simultaneously the Write right and the Execute right.

22. The apparatus of claim 11, wherein at least one identification unit is to identify whether there are simultaneously the Write right and the Execute right.

23. The apparatus of claim 11, further comprising: an exchange unit to reallocate the right deleted by the limiting unit and to delete a respective other right.

24. A non-transitory computer readable medium including program segments for, when executed on a computer, causing the computer to execute instructions comprising:
identifying whether there is an unsafe combination of Write and Execute rights for the memory segment;
deleting one of the Write and Execute rights, if the unsafe combination has been identified; and
carrying out the following steps at runtime ff the program has been interrupted,
examining a reason for which the program has been interrupted, initiating recovery measures if an attack has been identified,
exchanging rights if the interruption has been produced by the deletion of a right, and
forwarding at least one of monitoring and control to an operating system component if another reason for interruption has been identified, wherein
the unsafe combination of the Write and Execute rights includes a simultaneously existence of the Write and Execute rights, and
the identifying further includes monitoring the memory segment for a presence of the unsafe combination of Write and Execute rights, the monitoring being performed either cyclically or being triggered by an occurrence of configurable events.

25. A method for protecting a program system against buffer overflow attacks which are based on the intention to write data to a memory segment of a program and to execute these data as a code, the method comprising:
identifying, using a processor, whether there is an unsafe combination of Write and Execute rights for the memory segment that allows for buffer overflow attacks;
deleting, using the processor, one of the of the Write and Execute rights, ff the unsafe combination has been identified; and
carrying, using the processor, out the following steps at runtime if the program has been interrupted,
examining a reason for which the program has been interrupted, initiating recovery measures if the buffer overflow attack has been identified,
exchanging rights if the interruption has been produced by the deletion of a right, and
forwarding at least one of monitoring and control to an operating system component if another reason for interruption has been identified, wherein
the identifying and the deleting are executed during the runtime, the unsafe combination of the Write and Execute rights includes a simultaneously existence of the Write and Execute rights, and the identifying further includes monitoring the memory segment for a presence of the unsafe combination of Write and Execute rights, the monitoring being performed either cyclically or being triggered by an occurrence of configurable events.

* * * * *